(12) United States Patent
Hatakeyama

(10) Patent No.: US 7,468,228 B2
(45) Date of Patent: Dec. 23, 2008

(54) LIGHT SHIELDING FILM FOR DISPLAY DEVICE, PRODUCTION PROCESS THEREOF, METAL-PARTICLE-CONTAINING COMPOSITION, PHOTOSENSITIVE TRANSFER MATERIAL, SUBSTRATE FOR DISPLAY DEVICE, AND COLOR FILTER

(75) Inventor: Akira Hatakeyama, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 73 days.

(21) Appl. No.: 11/049,866

(22) Filed: Feb. 4, 2005

(65) Prior Publication Data

US 2005/0175933 A1 Aug. 11, 2005

(30) Foreign Application Priority Data

Feb. 6, 2004 (JP) .............. 2004-030854

(51) Int. Cl.
*G02B 5/20* (2006.01)
*G03C 1/73* (2006.01)
*G03C 1/705* (2006.01)
*G02F 1/1335* (2006.01)

(52) U.S. Cl. ............... 430/7; 430/28; 430/170; 430/270.1; 430/275.1; 430/321; 349/106; 349/110

(58) Field of Classification Search ............. 428/1.1, 428/1.5; 430/270.1, 281.1, 325, 7, 28, 170, 430/25.1, 321; 349/106, 110
See application file for complete search history.

(56) References Cited

U.S. PATENT DOCUMENTS

| 4,578,245 | A | * | 3/1986 | Arai et al. | ............ 422/56 |
| 5,048,933 | A | * | 9/1991 | Asano | ............ 349/61 |
| 6,001,533 | A | * | 12/1999 | Sega et al. | ............ 430/270.1 |
| 2004/0257502 | A1 | * | 12/2004 | Hatakeyama et al. | ....... 349/110 |
| 2005/0112364 | A1 | * | 5/2005 | Hatakeyama et al. | ....... 428/328 |

FOREIGN PATENT DOCUMENTS

JP 62-9301 A1 1/1987
JP 2004334182 * 11/2004

OTHER PUBLICATIONS

English translation by computer for JP 2004334182, http://www4.ipdl.inpit.go.jp/Tokujitu/PAJdetail.ipdl?N0000+60&N0120+01&N2001+2&N3001+2004-334182.*
"Color TFT Liquid Crystal Display", Semiconductor Equipment and Materials International, pp. 218-220, Jul. 20, 1996.

* cited by examiner

*Primary Examiner*—Shean C Wu
(74) *Attorney, Agent, or Firm*—Sughrue Mion, PLLC

(57) ABSTRACT

A light shielding film for a display device, comprising a polymer binder, metal particles dispersed in the polymer binder, and a compound including a sulfur atom or a nitrogen atom. A substrate for a display device comprising the light shielding film. And a color filter comprising the light shielding film.

19 Claims, 1 Drawing Sheet

LIGHT SHIELDING FILM FOR DISPLAY DEVICE, PRODUCTION PROCESS THEREOF, METAL-PARTICLE-CONTAINING COMPOSITION, PHOTOSENSITIVE TRANSFER MATERIAL, SUBSTRATE FOR DISPLAY DEVICE, AND COLOR FILTER

CROSS-REFERENCE TO RELATED APPLICATION

This application claims priority under 35 USC 119 from Japanese Patent Application No. 2004-30854, the disclosure of which is incorporated by reference herein.

BACKGROUND OF THE INVENTION

1. Field of the Invention

The present invention relates to a film for shielding light (referred to as a "light shielding film" hereinafter) which is to be disposed inside a display device such as a liquid crystal display device, a plasma display device, an EL display device, or a CRT display device.

2. Description of the Related Art

A light shielding film for a display is a black frame disposed inside a display device such as a liquid crystal display device, a plasma display device, an EL display device or a CRT display device; a lattice-shaped or stripe-shaped black edge around pixels (the so-called black matrix) in such a display device; or a black dot pattern or black line pattern for TFT light shielding.

An example of the display device light shielding film is a black matrix formed around red, blue and green pixels of a color filter, which prevents a drop in contrast caused by light leakage.

Another example thereof is a light shielding film provided on a thin film transistor (TFT), which is used in an active matrix driving type liquid crystal display device. This light shielding film is provided so as to prevent degradation in image quality of the TFT associated with electric current leakage caused by light. These light shielding films usually have to have such a light shielding property that the optical density thereof is 2 or more. The color of the light shielding film is preferably black from the viewpoint of the display quality of the display devices.

Metal has been used for producing a light shielding film for a display device having a high light shielding capability. An example of the process for the production may comprise forming a metal thin film by vapor deposition or sputtering, applying a photoresist onto the metal thin film, exposing the photoresist layer with a photo-mask having a pattern suitable for a light shielding film for a display device, developing the photoresist, etching the naked metal thin film, and peeling the resist layer on the metal thin film to form a light-shielding film (see, for example, *Color TFT Liquid Crystal Display Device*, pp. 218-220 (Apr. 10, 1997) published by Kyoritsu Shuppan Co., Ltd), the disclosure of which is incorporated by reference herein.

Since the metal thin film is used in this process, a high light shielding effect can be obtained even if the thickness of the film is small. However, since the process requires a film-formation in vacuum such as the vapor deposition or sputtering and an etching, the cost is high. The process also has a problem that the resultant light shielding film has a high reflectivity since it is made of metal, and that only a low display contrast can be obtained under intense external light. For dealing with this problem, a method can be employed in which a low reflective chromium film (such as a bi-layered film composed of a metal chromium film and a chromium oxide film) is used. However, this method costs higher. Besides, Chromium, which is most frequently used in this method, has a drawback of imposing a large load onto the environment.

There is a technique of using carbon black to form a light shielding film for a display device having a low reflectivity (see Japanese Patent Application Laid-Open (JP-A) No. 62-9301, the disclosure of which is incorporated by reference herein. This light shielding film is a film obtained by applying a photosensitive resin composition containing carbon black onto a substrate, drying the composition, exposing the resultant film to light, and developing the film.

However, carbon black has a lower ratio of the optical density to the coating amount than in the case of metal particles; therefore, the thickness of the film made of carbon black is inevitably large when a high light shielding performance and optical density are secured. Furthermore, this technique has drawbacks that in the case that pixels in red, blue and green are formed after the light shielding film is formed, air bubbles develop and the pixels are likely to be irregular.

SUMMARY OF THE INVENTION

In light of the above-mentioned problems, the preset invention has been made.

A first aspect of the invention is to provide a light shielding film for a display device, comprising a polymer binder, metal particles dispersed in the polymer binder, and a compound including a sulfur atom or a nitrogen atom. The light shielding film may be formed on a substrate.

A second aspect of the invention is to provide a composition comprising a polymer binder, metal particles, and a compound including a sulfur atom or a nitrogen atom.

A third aspect of the invention is to provide a photosensitive transfer material comprising a temporary support and a photosensitive light shielding layer provided on the temporary support, wherein the photosensitive light shielding layer comprises a polymer binder, metal particles, and a compound including a sulfur atom or a nitrogen atom.

A fourth aspect of the invention is to provide a process for producing a light shielding film, comprising:
applying the composition of the second aspect to a substrate.

A fifth aspect of the invention is to provide a process for forming a light shielding film, comprising:
providing the photosensitive transfer material of the third aspect;
transferring the photosensitive light shielding layer of the photosensitive transfer material to a substrate; and
patterning the photosensitive light shielding layer on the substrate.

A sixth aspect of the invention is to provide a substrate for a display device, comprising the light shielding film of the first aspect.

A seventh aspect of the invention is to provide a color filter for a display device, comprising the light shielding film of the first aspect.

According to the invention, it is possible to provide a light shielding film for a display device in which metal particles are well dispersed; a metal-particle-containing composition and a photosensitive transfer material for forming the light shielding film; a process for forming a light shielding film; and a substrate and a color filter used for a display device.

DETAILED DESCRIPTION OF THE INVENTION

Light Shielding Film

Figure 1A:
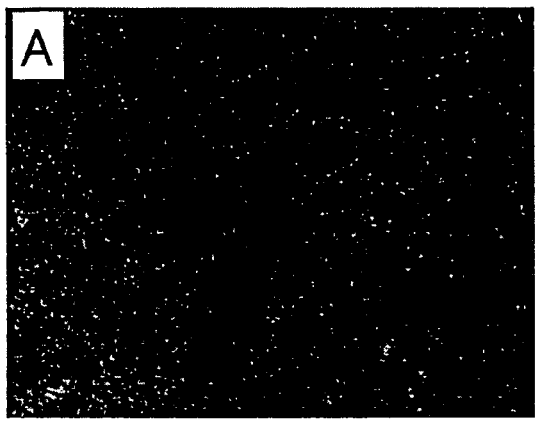
FIG. 1A is a photograph showing a rank A dispersion state of silver particles.

The light shielding film for a display device referred to in the present invention is a film for shielding light wherein the film is to be disposed inside of a display device such as a liquid crystal display device, a plasma display device, an EL display device, or a CRT display device. Examples thereof include a black frame disposed at the periphery of a display device; a lattice-shaped or stripe-shaped black edge disposed around pixels (the so-called black matrix); and a black dot pattern or black line pattern for TFT light shielding.

The light shielding film for a display device of the invention may be patterned or unpatterned. A light shielding film having a solid pattern on the whole surface is not included in the scope of the patterned light shielding film.

The light shielding film comprises a polymer binder, metal particles dispersed in the polymer binder, and a compound including a sulfur atom or a nitrogen atom. The compound including a sulfur atom or a nitrogen atom is occasionally referred to as "compound (V)" hereinafter.

Metal Particles

The term "metal" used herein refers to the metal defined on p. 444 of "Iwanami Rikagaku Jiten 5$^{th}$ edition" (published by Iwanami Shoten in 1988), the disclosure of which is incorporated by reference herein.

The metal particles used in the invention are preferably made of silver, gold, platinum, palladium, tungsten, titanium, copper or any alloy thereof, from the viewpoints of safety and load to surroundings. Silver is particularly preferable from the viewpoints of the chemical stability and costs.

The metal particles used in the invention may have an even composition or an uneven composition. The uneven composition may be such a composition that a coating layer having a different composition from the interior part is provided on the interior part to form the surface. The shape of the metal particles used in the invention is not particularly limited, and may be selected from various shapes such as a spherical shape, an indeterminate shape, a plate shape, a cubic shape, a regular octahedral shape, and a columnar shape.

The average particle size of the metal particles used in the invention is preferably from 3 to 3000 nm, more preferably from 60 to 250 nm. If the average particle size is less than 1 nm, the absorption wavelength of the particles is undesirably short. If the size is more than 3000 nm, undesirably, the particles are likely to be colored or to have a low optical density.

The particle size distribution of the metal particles is not particularly limited.

The process for producing the metal particles used in the invention is not particularly limited. A known production process may be adopted, examples of which include gas phase processes such as evaporative condensation and gas phase reducing processes; and liquid phase processes such as a liquid phase reducing process. Details thereof are described in "Newest Tendency II on Technique and Application of Super Particles" (published in S. B. Techno-Research Co., Ltd. in 2002), the disclosure of which is incorporated by reference herein.

For example, in the case of silver particles (colloidal silver), a process which has been known hitherto can be used, examples of which include a process of reducing a soluble silver salt with hydroquinone in an aqueous solution of gelatin disclosed in U.S. Pat. No. 2,688,601 (the disclosure of which is incorporated by reference herein); a process of reducing a slightly-soluble silver salt with hydrazine disclosed in DE Pat. No. 1,096,193 (the disclosure of which is incorporated by reference herein); processes of reducing silver ions chemically in a solution, such as a process of reducing silver with tannic acid disclosed in U.S. Pat. No. 2,921,914 (the disclosure of which is incorporated by reference herein); a process of forming silver particles by electroless plating described in JP-A No. 5-134358 (the disclosure of which is incorporated by reference herein); and an in-gas evaporating process of evaporating a bulk metal in an inert gas such as helium and then cold-trapping the metal vapor with a solvent.

Polymer Binder

Examples of the polymer binder included in the light shielding film of the invention is explained in the following.

When an after-mentioned non-photosensitive composition including metal particles is used for forming the light shielding film, it is preferable to use a water-soluble polymer binder or an alkali-soluble polymer binder. Preferable examples thereof include polyvinyl alcohol; gelatin; cellulose polymer binders such as methyl cellulose; and (meth)acrylic acid-(meth)acrylate copolymers and styrene-(meth)acrylic acid copolymers, which are obtained by copolymerization of monomers which include acrylic acid and/or methacrylic acid and which optionally include methyl methacrylate, ethyl acrylate, benzyl acrylate, styrene or other monomers.

Polymer binders whose components include a (meth)acrylic acid-(meth)acrylate copolymer or a styrene-(meth)acrylic acid copolymer, each of which comprises acrylic acid and/or (meth)acrylic acid, are preferable since they can be patterned by alkali development.

The total proportion of acrylic acid and methacrylic acid in the copolymers is preferably 10 to 60% by mass, more preferably 20 to 50% by mass.

Specific examples of the copolymers include benzyl methacrylate-methacrylate acid (60/40); methyl methacrylate-styrene-methacrylic acid (10/60/30); methyl methacrylate-styrene-acrylic acid-methacrylic acid (20/50/15/15); benzyl methacrylate-methyl methacrylate-methacrylic acid (40/35/35); and styrene-acrylic acid-methacrylic acid (60/20/20). The numbers in the parentheses "( )" represent the ratio by mass. The volume ratio of the polymer binder to the metal particles may be in the range of 0.3:1 to 100:1, preferably in the range of 1.5:1 to 30:1. If the ratio is excessively high, the thickness of the light shielding film is undesirably large. If the ratio is too small, sufficient optical density is unlikely to be obtained.

In the case of using the after-mentioned photosensitive composition including metal particles for forming the light shielding film, it is preferable to incorporate a photopolymerizable monomer and/or a photosensitive oligomer into the composition and use the resultant photo-polymerized product as the polymer binder. The photopolymerizable monomer and oligomer preferably have thermal polymerizability. In this case, the polymer binder can be further cured by a thermal treatment after being photopolymerized. As described above, an alkali-soluble polymer may be added to the composition.

The photopolymerizable monomer is preferably a polyfunctional acrylic monomer such as ethylene glycol (meth)acrylate, triethylene glycol di(meth)acrylate, 1,3-butanediol di(meth)acrylate, tetramethylene glycol di(meth)acrylate, propylene glycol di(meth) acrylate, trimethylolpropane tri(meth)acrylate, 1,4-hexanediol (meth)acrylate, pentaerythritol hexa(meth)acrylate, or dipentaerythritol hexa(meth)acrylate. The polyfunctional monomer can be polymerized (or crosslinked) by use of light or heat, as described above. Of these examples, preferable are monomers which can be photopolymerized by using, as a polymerization initiator, a halomethyl-s-triazine compound such as bis[4-[N-[4-(4,6-bistrichloromethyl-s-triazine-2-yl)phenyl]carbamoyl]phenyl] cebacate.

The volume ratio of the monomer to the metal particles may be in the range of 0.3:1 to 100:1, preferably in the range of 1.5:1 to 30:1. If the ratio is excessively high, the thickness of the light shielding film is undesirably large. If the ratio is too small, the strength of the light shielding film is likely to be insufficient.

Compound (V) Including a Sulfur Atom or a Nitrogen Atom

If the compound (V) including a sulfur atom or a nitrogen atom is added to the light shielding film, the dispersion stability of the metal particles is improved. The sulfur atom or nitrogen atom may be included in the compound (V) in any form. In a preferable embodiment, the sulfur atom or nitrogen atom is included in a form of a thiol, thioether, thioxo, amino or imino group. Such groups may be substituted or non-substituted.

Preferable examples of the compound (V) include the following:

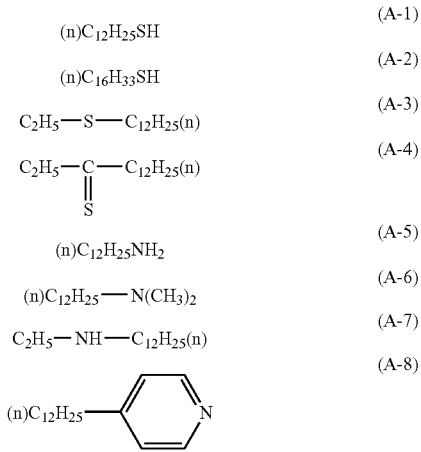

Furthermore, polyvinyl alcohols each having a terminal SH group (such as M205 and M115 (trade name), manufactured by Kuraray Co., Ltd.) are also preferable.

The amount of the compound (V) to be added is preferably 0.1% by mass or more, more preferably from 0.3 to 100% by mass, still more preferably from 3 to 30% by mass, further preferably from 10 to 20% by mass, based on the mass of the metal particles. In addition to the compound (V), known additives such as a dispersing agent, a dispersion stabilizer, and a surfactant may be used.

Other Additives

In addition to the particles, the following may be added to the light shielding film of the invention if necessary.

(1) Pigment

A pigment may be added to the light shielding film. The pigment may be a black pigment such as carbon black. The amount of the pigment to be added is preferably 50% by mass or less, more preferably 30% by mass or less based on the mass of the particles of the invention. If the amount of the pigment is more than 50% by mass, the required thickness of the light shielding film thickness for obtaining a necessary optical density increases, so that the quality of red, blue and green pixels formed thereon lowers.

The light shielding film of the invention may further include a blue pigment or the like in addition to the black pigment in order to adjust the color tone of the film. The amount of the non-black pigment to be added is preferably 40% by mass or less, more preferably 20% by mass or less based on the mass of the particles of the invention. If the amount is more than 40% by mass, the color tone of the light shielding film is deteriorated in some cases.

(2) Surfactant

A surfactant may be added to the light shielding film of the invention, for example in order to improve the coatability or the dispersion stability of the particles. The surfactant is not particularly limited, and may be a nonionic, anionic, or cationic surfactant. Of these surfactants, an anionic surfactant is particularly preferable from the viewpoint of the stability of the liquid. A fluorine-containing surfactant is also preferable.

Preferable examples of the surfactant include $C_8F_{17}SO_2N(C_2H_5)(C_2H_4O)_{14}H$, $C_8F_{17}SO_3Li$, $C_7F_{15}COONH_4$, and $C_8F_{17}SO_2N(C_2H_5)C_2H_4OPO(OH)_2$. Additional examples thereof include oligomer type fluorine-containing surfactants (trade name: F110, F113, F120, F150, F176PF, F177, and F780, manufactured by Dainippon Ink & Chemicals, Inc.).

(3) Polymer Dispersion Stabilizer

A polymer dispersion stabilizer may be added to the light shielding film of the invention in order to improve the dispersion stability of the particles of the invention. Examples of the polymer dispersion stabilizer include polyvinyl alcohol, acrylamide-acrylic acid copolymer, styrene-maleic anhydride copolymer, sodium polyacrylate, and sodium alginate.

The polymer dispersion stabilizer is described in, for example, "Pigment Dispersing Technique (Technical Information Institute Co., Ltd., published in 1999)", the disclosure of which is incorporated by reference herein.

Substrate

The substrate used in the invention is preferably a glass substrate which is ordinarily used in display devices. The glass substrate may be a glass substrate made of a known glass such as sodium glass, low-alkali glass or nonalkali glass. Examples of the glass substrate are described in, for example, "Guide to Liquid Crystal Display Engineering (written by Hanae Suzuki, and published in Nikkan Kogyo Shimbun, Ltd. (1998))". Other examples of the substrate include a silicon wafer and a transparent plastic substrate such as a transparent plastic substrate made of a polyolefin. A TFT substrate can also be used.

The thickness of the substrate is preferably from 0.5 to 3 mm, more preferably from 0.6 to 2 mm.

The light shielding film of the invention has a structure in which the particles are dispersed in the polymer binder. The thickness of the light shielding film is preferably 0.05 to 0.5 μm, more preferably 0.1 to 0.3 μm. If the thickness is more than 0.5 μm, the unevenness of the substrate (i.e., the difference in level between the area on the substrate where the light shielding film is formed and the area on the substrate where the film is not formed) is too large, so that a trouble is caused when BRG pixels are formed thereon. Conversely, if the thickness is less than 0.1 μm, a required optical density cannot be obtained, so that problems occur such as a drop in the contrast of the display device.

The content of the particles in the light shielding film of the invention is preferably 5 to 70%, more preferably 10 to 50% as the volume fraction of the particles. The "volume fraction" is the ratio of the total volume of the particles of the invention to the total volume of the light shielding film.

If the volume fraction is less than 5%, the required film thickness for obtaining a required thickness exceeds 1 μm. Conversely, if the volume fraction is more than 70%, the dispersion stability of the particles lowers.

The optical density of the light shielding film of the invention is preferably from 2.0 or more, more preferably 3.5 or more. If the optical density is less than 2.0, the display quality of the display device, such as the contrast thereof, lowers.

Composition Including Metal Particles

The composition (coating liquid for forming the light shielding film, occasionally referred to as composition (Q)) including the metal particles of the invention comprises the metal particles and the compound (V). In a preferable embodiment, the composition (Q) further comprises a polymer binder. A solvent or the like may be added to the composition (Q) in accordance with the necessity. The composition (Q) may be non-photosensitive or photosensitive.

Non-Photosensitive Composition Including Metal Particles

As described above, the non-photosensitive composition used in the invention comprises the polymer binder, the metal particles and the compound (V), and may optionally comprise a solvent or the like in accordance with the necessity.

The solvent may be a known organic solvent. Particularly preferable examples of the organic solvent include methyl alcohol, isopropyl alcohol, MEK, ethyl acetate and toluene. Water is also preferable as the solvent. Mixtures of these solvents may also be used in accordance with the necessity.

The SP value of the solvent, which will be detailed later, may be 9.0 or higher.

Photosensitive Composition Including Metal Particles

The photosensitive composition including the metal particles used in the invention comprises a photosensitive resin composition (the photosensitive resin composition comprising the photopolymerizable monomer and/or oligomer and a photopolymerization initiator) which is to constitute the polymer binder after photopolymerization thereof; the metal particles; and the compound (V). The photosensitive resin composition may be a composition described in JP-A-No. 10-160926 (the disclosure of which is incorporated by reference herein), paragraphs 0016 to 0022, and 0029 or may be a photosensitive resin composition comprising such a monomer and/or oligomer as described above. Another photopolymerizable monomer may be added to the photosensitive resin composition.

When the metal particles are used as an aqueous dispersion such as the above-mentioned silver colloid, the photosensitive resin composition needs to be water-based. Examples of such water-based photosensitive resin composition include the compositions described in JP-A No. 8-271727 (the disclosure of which is incorporated herein by reference), paragraphs 0015 to 0023, and commercially available products such as SPP-M20 and SPP-H-13 manufactured by Toyo Gosei Kogyo Co., Ltd.

Preparation of Composition (Q) Including Metal Particles

In order to prepare the composition (Q) (which may be photosensitive or non-photosensitive), the metal particles, the compound (V), the polymer binder (which may be the photosensitive resin composition), and the like may be mixed together in a solvent and dispersed in the solvent. However, in a preferable embodiment, a dispersion of the metal particles is prepared by using the compound (V), then the polymer binders and the like are added to and mixed with the dispersion.

The solvent used in the preparation of the dispersion of the metal particles is not particularly limited. A solvent having an SP value of 9.0 or higher is preferable. The "SP value" is also referred to as the solubility parameter, and is the square root of cohesive energy density. In the invention, the SP value means the value described on p. 838 of "Adhesive Handbook" (edited by The Adhesion Society of Japan, and published by in Nikkan Kogyo Shimbun, Ltd. in 1971), the disclosure of which is incorporated by reference herein.

For example, n-hexane has an SP value of 7.3; toluene, 8.9; ethyl acetate, 9.1; methyl ethyl ketone, 9.3; acetone, 10.0; ethyl alcohol, 12.7; methyl alcohol, 14.5; and water, 23.4. The unit of the SP value is "$(cal/cm^3)^{1/2}$".

When a solvent having an SP value of 9.0 or higher is used for the preparation of the dispersion of the metal particles, the dispersion properties are particularly good. Therefore, a sufficient optical density can be attained even with a small thickness of the film.

The dispersion of the metal particles can be prepared by using a known dispersing machine such as a paint shaker, a ball mill or an Eiger mill. A mixed solution including the metal particles, the compound (V) and the solvent is subjected to the dispersing treatment with such a machine.

The composition (Q) can be prepared by adding the binder, the photosensitive composition, or the like to the dispersion of the metal particles, which was prepared as described above, and mixing the components.

Formation of Light Shielding Film

The light shielding film for a display device of the invention can be prepared, for example by: a process comprising applying the non-photosensitive or photosensitive metal-particle-containing composition to a substrate and then drying the composition; or a process comprising applying the photosensitive metal-particle-containing composition to a temporary support, drying the composition to form a photosensitive transfer material having a photosensitive light shielding layer, and then transferring the photosensitive light shielding layer onto a substrate.

In order to make a patterned light shielding film, the light shielding film or the photosensitive light shielding film prepared by such a method as described above is further patterned. Examples of the method for the patterning include: a exposure-development method; a method comprising removing unnecessary portions by the heat generated by a laser light (i.e., ablation method); and a method comprising applying a photosensitive resist film to the light shielding film of the invention formed on the substrate, patterning this film by exposure and development, and then removing the photosensitive resist film. In the invention, any of these methods may be used. The following methods are preferred from the viewpoints of simplicity of the process and the resolution of the patterning.

(1) A method comprising applying the non-photosensitive metal-particle-containing composition to a substrate, drying the applied composition to form a layer (occasionally referred to as a light shielding layer hereinafter), applying a photoresist onto the light shielding layer, patterning the photoresist layer by exposure and development, and then dissolving and removing the photoresist layer and the underlying light shielding layer together.

(2) A method comprising applying the photosensitive metal-particle-containing composition to a substrate, drying the applied composition to form a layer (occasionally referred to as the photosensitive light shielding layer hereinafter), and then patterning the photosensitive light shielding layer by exposure and development (which removes the unexposed areas).

(3) A method of applying the photosensitive metal-particle-containing composition onto a temporary support, drying the applied composition to form a photosensitive light shielding layer, transferring the photosensitive light shielding layer onto a substrate, and then patterning the photosensitive light shielding layer by exposure and development (which removes the unexposed areas) [i.e., a method using a photosensitive transfer material].

All of these methods make it possible to form the light shielding film in a simpler manner than conventional methods which use vapor deposition or sputtering. In particular, the method using a photosensitive transfer material is particularly preferable since aggregation of the particles does not occur even when the metal-particle-containing composition is stored for a long term.

Method for Applying the Composition to Substrate

The method for applying the metal-particle-containing composition to the substrate or the temporary support is not particularly limited. The method may be, for example, a spin coating described in JP-A No. 5-224011, or a die coating described in JP-A No. 9-323472. These publications are incorporated by reference herein.

Exposure and Development

The above-mentioned exposure and development are preferably conducted as follows.

The light source used in the exposure is selected in accordance with the photosensitivity of the photoresist layer or photosensitive light shielding layer. The light source may be a known light source such as an extra high-pressure mercury lamp, a xenon lamp, a carbon arc lamp, or an argon laser. As described in JP-A No. 6-59119 (the disclosure of which is incorporated by reference herein), an optical filter having a light transmissivity of 2% or lower to a wavelength of 400 nm or longer may be used in the exposure.

The method for the exposure may be a single-operation exposure in which the entire surface of the substrate is exposed to light at a time, or a segmented exposure in which each part of the substrate surface is exposed separately. The method for the exposure may be a method in which the surface of the substrate is scanned with a laser light.

A dilute aqueous solution of an alkaline substance is used as the developer in the development. The solution may comprise a small amount of an organic solvent miscible with water. Preferable examples of the alkaline material include alkali metal hydroxides (such as sodium hydroxide and potassium hydroxide); alkali metal carbonates (such as sodium carbonate and potassium carbonate); alkali metal bicarbonates (such as sodium hydrogencarbonate and potassium hydrogencarbonate; alkali metal silicates (such as sodium silicate and potassium silicate); alkali metal metasilicates (such as sodium metasilicate, and potassium metasilicate); triethanolamine; diethanolamine; monoethanolamine; morpholine; tetraalkylammonium hydroxides (such as tetramethylammonium hydroxide); and trisodium phosphate. The concentration of the alkaline substance in the developer is preferably 0.01 to 30% by mass. The pH of the developer is preferably 8 to 14. In an embodiment, the pH of the developer is changed in accordance with the properties (for example, the oxidizability) of the photosensitive light shielding layer, so that the development can be conducted through removal of the film.

Preferable examples of the organic solvent miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethylformamide, dimethylacetoamide, hexamethylphosphoamide, ethyl lactate, methyl lactate, $\epsilon$-caprolactam, and N-methylpyrrolidone. The concentration of the organic solvent miscible with water in the developer is generally 0.1 to 30% by mass.

A known surfactant may be added to the developer. The concentration of the surfactant in the developer is preferably 0.01 to 10% by mass.

The developer may be used as a bath liquid or a spraying liquid. In order to remove the uncured portions of the photosensitive light shielding layer or the like in a solid form (preferably, in a film form), it is preferable to use a method of rubbing the portions with a rotating brush or a wet sponge in the developer, or a method utilizing the spraying pressure of the developer. Usually, the temperature of the developer is preferably in the range of around ambient temperature to 40° C.

Rinsing step with water may be provided after the development.

After the development, the light shielding layer may be subjected to heat treatment. In this treatment, the photosensitive light shielding layer cured by light is further cured by the heat, so that the solvent resistance and the alkali resistance of the layer can be improved. In the heat treatment, the substrate may be heated in an electric furnace, a drying machine, or the like, or heated by an infrared lamp.

The heating temperature and the heating time depend on the composition and the thickness of the photosensitive light shielding layer. The heat treatment is preferably conducted at 120 to 250° C. for 10 to 300 minutes, more preferably at 180 to 240° C. for 30 to 200 minutes.

In-between the development and the heat treatment, the photosensitive light shielding layer may be exposed to light so as to promote the curing. This exposure can be conducted in the same manner as in the first exposure.

Protective Layer

In the invention, a protective layer may be provided on the photosensitive light shielding layer during the period between the formation of the photosensitive light shielding layer and the exposure thereof. The protective layer is provided in order to block oxygen at the time of the exposure, thereby improving the sensitivity of the photosensitive light shielding layer. Thus, the protective layer is preferably a layer made mainly of an oxygen-blocking resin, for example, polyvinyl alcohol. This layer is removed by development since the layer is unnecessary after the light shielding film is formed.

Photosensitive Transfer Material

The photosensitive transfer material used in the abovementioned item (3) (the method (3) of preparing a patterned light shielding film) is a material comprising a temporary support having thereon a photosensitive light shielding layer obtained by applying and drying the above-mentioned photosensitive metal-particle-containing composition. In a preferable embodiment, the photosensitive transfer material further comprises a thermoplastic resin layer between the temporary support and the photosensitive light shielding layer. Preferably, an alkali-soluble intermediate layer may be further provided between the thermoplastic resin layer and the photosensitive light shielding layer.

The temporary support is preferably made of a material which is chemically and thermally stable and which is flexible. Specifically, the temporary support is preferably a sheet made of TEFLON, polyethylene terephthalate, polyethylene naphthalate, polyacrylate, polycarbonate, polyethylene, polypropylene or the like, or a laminate of these sheets. When the thermoplastic resin layer is provided on the temporary support, the temporary support preferably has such a characteristic that the temporary support can easily be peeled off the thermoplastic resin layer. The thickness of the temporary support is preferably from 5 to 300 µm, more preferably from 20 to 500 µm.

Thermoplastic Resin Layer

Examples of the resin constituting the thermoplastic resin layer of the invention include acrylic resin, polystyrene resin, polyester, polyurethane, rubber resin, vinyl acetate resin, polyolefin resin, and copolymers thereof. It is not essential but preferable for the resin constituting the thermoplastic resin layer of the invention to be alkali-soluble.

Specifically, the resins constituting the thermoplastic resin layer of the invention may include a resin selected from a saponificated product of a copolymer of ethylene and an acrylic ester; a saponificated product of copolymer of styrene and a (meth)acrylic ester; a terpolymer of styrene, (meth) acrylic acid and a (meth)acrylic ester; a saponificated product of copolymer of vinyltoluene and a (meth)acrylic ester; poly (meth)acrylate; a saponificated product of a copolymer comprising (meth)acrylic ester such as a copolymer of butyl (meth)acrylate and vinyl acetate; and a polymer soluble in aqueous alkali solution among the organic polymers described in "Plastic Performance Handbook" (edited by The Japan Plastics Industry Federation and All Japan Plastic Molding Industry Association and published by Kogyo Chosakai Publishing Inc. on Oct. 25, 1968), the disclosure of which is incorporated by reference herein.

In a preferable embodiment, a mixture of some of these resins is used as explained in the following.

One resin (occasionally referred to as resin (A) hereinafter) included in the mixture has a weight-average molecular weight of 50000 to 500000 and a glass transition temperature (Tg) of 0 to 140° C. The resin (A) preferably has a weight-average molecular weight of 60000 to 200000 and a glass transition temperature (Tg) of 30 to 110° C. Specific examples of the resin (A) include resins soluble in aqueous alkali solution described in Japanese Patent Publication (JP-B) Nos. 54-34327, 55-38961, 58-12577, 54-25957 and 59-44615; JP-A Nos. 61-134756, 54-92723, 54-99418, 54-137085, 57-20732, 58-93046, 59-97135, 60-159743, 60-247638, 60-208748, 60-214354, 60-230135, 60-258539, 61-169829, 61-213213, 63-147159, 63-213837, 63-266448, 64-55551, 64-55550, 2-191955, 2-199403, 2-199404, 5-241340 and 2-208602, OLS (German Patent Application Laid-Open) No. 3504254. The disclosures of these publications are incorporated herein by reference. Particularly preferable is a (methacrylic acid)-(2-ethylhexyl acrylate)-(benzyl-methacrylate)-(methyl methacrylate) copolymer described in JP-A No. 63-147159.

Another resin (occasionally referred to as resin (B) hereinafter) included in the mixture has a weight-average molecular weight of 3000 to 30000 and a glass transition temperature (Tg) of 30 to 170° C. Preferably, the resin (B) has a weight-average molecular weight of 4000 to 20000 and a glass transition temperature (Tg) of 60 to 140° C. Preferable examples thereof include the resins described in the above-mentioned patent application specifications. Particularly preferable are styrene-(meth)acrylic acid copolymers described in JP-B No. 55-38961 and JP-A No. 5-241340, the disclosures of which are incorporated by reference herein.

If the weight-average molecular weight of the resin (A) in the thermoplastic resin layer is less than 50000 or the glass transition temperature (Tg) thereof is lower than 0° C., reticulations occur or the thermoplastic resin protrudes at the time of the transfer to pollute the permanent support. If the weight-average molecular weight of the resin (A) is more than 500000 or the glass transition temperature (Tg) thereof is higher than 140° C., air bubbles enter the space between the pixels at the transfer or the removability of the thermoplastic resin by an aqueous alkali solution lowers.

The thickness of the thermoplastic resin layer is preferably 6 µm or larger for the following reason: if the thickness is 5 µm or smaller, this layer cannot absorb the unevenness of 1 µm or larger on the underlying member completely. The upper limit of the layer is about 100 µm or smaller, preferably about 50 µm or smaller from the viewpoints of the removability by an aqueous alkali solution and the productivity.

The coating solvent for the thermoplastic resin layer of the invention can be used without any particular limitation as long as the solvent can dissolve the resins constituting this layer. Examples thereof include methyl ethyl ketone, n-propanol, and i-propanol.

It is preferable to provide an alkali-soluble intermediate layer between the thermoplastic resin layer and the photosensitive light shielding layer, the intermediate layer preventing the thermoplastic resin layer and photosensitive light shielding layer from mixing with each other at the coating.

Alkali-Soluble Intermediate Layer

The resin constituting the intermediate layer may be any alkali-soluble resin. Examples of the resin include polyvinyl alcohol resin, polyvinyl pyrrolidone resin, cellulose resin, acrylamide resin, polyethylene oxide resin, gelatin, vinyl ether resin, and polyamide resin, and copolymers thereof. The resin may be an alkali-soluble resin obtained by copolymerization of a monomer having a carboxyl group or a sulfonic acid group and a monomer whose homopolymer is usually not alkali-soluble such as polyester.

Of these reins, polyvinyl alcohol is preferable. The polyvinyl alcohol preferably has a saponification degree of 80% or higher, more preferably 83 to 98%.

It is preferable to use a mixture of two or more resins in the intermediate layer. It is particularly preferable to use a mixture of polyvinyl alcohol and polyvinyl pyrrolidone. The ratio by mass of polyvinyl pyrrolidone to polyvinyl alcohol is preferably from 1/99 to 75/25, more preferably from 10/90 to 50/50. If the ratio by mass is lower than 1/99, the following problems may be caused: the surface state of the intermediate layer deteriorates or the adhesion of the intermediate layer to the photosensitive resin layer to be provided on the intermediate layer is poor. If the ratio by mass is higher than 75/25, the oxygen-blocking capability of the intermediate layer is likely to be low so that the sensitivity is likely to be lowered.

The thickness of the intermediate layer is preferably 0.1 to 5 µm, more preferably from 0.5 to 3 µm. If the thickness is less than 0.1 µm, the oxygen-blocking property may deteriorate. If the thickness is larger than 5 µm, the time required for removing the intermediate layer increases.

The coating solvent for the intermediate layer is not particularly limited so long as the solvent can dissolve the resins, and is preferably water. A mixed solvent of water and such a water-miscible organic solvent as described above is also preferable. Preferable and specific examples of the coating solvent include water, water-methanol (90/10), water-methanol (70/30), water-methanol (55/45), water-ethanol (70/30), water-(1-propanol) (70/30), water-acetone (90/10), and water-methyl ethyl ketone (95/5). The ratios in the parentheses "( )" represent the ratios by mass.

As described above, the photosensitive transfer material comprises a photosensitive light shielding layer prepared by using the coating liquid including the particles of the invention. Therefore, a light shielding film which is thin and high in optical density can be prepared by using the photosensitive transfer material.

The following describes the method for transferring the photosensitive light shielding layer to a substrate. The method is preferably a method comprising closely contacting the photosensitive light shielding layer and the substrate, and laminating them. The lamination may be conducted by using a known laminator such as a vacuum laminator. An auto-cut laminator may be used in order to increase the friction. The heating temperature and the pressure to be applied at the time of the lamination are preferably about 60 to 150° C. and about 0.2 to 20 kg/cm$^2$, respectively. In the invention, it is preferable to perform the lamination at a substrate line velocity of about 0.05 to 10 m/minute.

After the lamination, the temporary support is peeled off.

After the light shielding layer is transferred to the substrate, the layer is subjected to exposure and development. The exposure and development may be conducted in such a manner as described above.

Substrate for Display Device

The substrate for a display device of the invention is a product in which the light shielding film is provided on a substrate. The substrate may be selected from the substrates described above.

Color Filter for Display Device

An embodiment of the color filter for a display device of the invention is a product having, on a color filter substrate, the above-mentioned light shielding film (black matrix) and two or more pixel-groups (occasionally referred to as "pixel-groups" hereinafter) having respectively different colors. The color filter substrate may be selected from the substrates described above. The color filter, which has the light shielding film, is excellent in light utilization efficiency, contrast, and capability of screening wiring.

Another embodiment of the color filter for a display device of the invention is a product in which a TFT element substrate is used as the color filter substrate and in which the light shielding film of the invention and plural pixel-groups are provided on the substrate. Still another embodiment thereof is a product in which a TFT element substrate is used as the color filter substrate, and in which only the black matrix is provided on the TFT element substrate and in which pixel-groups are provided on another light-transmissible substrate. In this embodiment, the numerical aperture of the TFT array is excellent.

The above-mentioned pixel-groups can be formed in a usual manner using plural kinds of pixel-forming, coloring photosensitive resin compositions or pixel-forming photosensitive transfer materials. After the formation of the pixel-groups, the pixel-groups are preferably subjected to a heat treatment.

EXAMPLES

The present invention is more specifically described by way of the following examples. However, the invention is not limited to these examples.

Examples 1 to 5

Preparation of Metal Particle Dispersion

Into a 100 mL glass bottle, the following substances were added: 7.5 g of silver particles having an average particle size of 30 nm, 50 mL of a dispersing medium shown in Table 1, the compound shown in Table 1 in the amount shown in Table 1, 35 g of glass beads having a diameter of 3 mm. Then, the mixture was subjected to dispersing treatment in a paint shaker for 2 hours.

Coating liquid for Forming Black Matrix

To 10 g of the metal particle dispersion was added 2 g of a photosensitive resin (trade name: SPP-H-13, manufactured by Toyo Gosei Kogyo Co., Ltd.), so that a coating liquid for forming a black matrix having photosensitivity was obtained.

Formation of Black Matrix

The coating liquid for forming black matrix was applied onto a glass substrate having a thickness of 1.1 mm, and then the coating liquid was dried at 100° C. for 5 minutes. The coating thickness was such a thickness that the optical density of the dry film was 3.6.

An extra-high pressure mercury lamp was used to pattern-expose the resultant film on the substrate at an energy of 500 mJ/cm$^2$ through a photo-mask for forming black matrix. Then, an alkaline developer (trade name: TCD, manufactured by Fuji Photo Film Co., Ltd.) was used to conduct development at 33° C. for 20 seconds, so as to yield a black matrix.

Examples 6 to 9

A silver particle dispersion for each of Examples 6 to 9 was prepared in the same way as in Example 1 except that the compound and the dispersing medium therein were changed as shown in Table 1. The following photosensitive composition was added to 40 g of the silver particle dispersion to prepare each coating liquid for forming a black matrix.

Photosensitive Composition

| | |
|---|---|
| Surfactant (trade name: F176PF manufactured by Dainippon Ink and Chemicals Incorporated., 20% solution): | 0.2 g |
| Hydroquinone monomethyl ether: | 0.001 g |
| Dipentaerythritol hexaacrylate: | 0.28 g |
| Bis[4-[N-[4-(4,6-bistrichloromethyl-s-triazine-2-yl)phenyl]carbamoyl]phenyl] sebacate: | 0.05 g |

A protective layer coating liquid having a composition described below was prepared.

Preparation of Protective Layer Coating Liquid

| | |
|---|---|
| Polyvinyl alcohol (PVA 205, manufactured by Kuraray Co., Ltd.): | 3.0 g |
| Polyvinyl pyrrolidone (trade name: PVP-K30, manufactured by GAF Corporation): | 1.3 g |
| Distilled water: | 50.7 g |
| Methyl alcohol: | 45.0 g |

Formation of Black Matrix

The coating liquid for forming a black matrix was applied onto a glass substrate having a thickness of 1.1 mm, and then the liquid was dried at 100° C. for 5 minutes. The coating thickness was determined so that the optical density of the dry film was 3.6. Then, the protective layer coating liquid was applied thereto by a spin coater so that the dry film thickness was 1.5 μm. Thereafter, the film was dried at 100° C. for 5 minutes.

An extra-high pressure mercury lamp was used to pattern-expose the resultant film on the substrate at an energy of 100 mJ/cm². Then, an alkaline developer (trade name: TCD, manufactured by Fuji Photo Film Co., Ltd.) was used to conduct development at 33° C. for 20 seconds, so as to yield a black matrix.

Comparative Examples 1 to 3

Each of the black matrixes of Comparative Examples 1 to 3 was formed in the same manner as in Example 1 except that the compound and the dispersing medium therein were changed as shown in Table 1.

dried at 100° C. for 2 minutes, and then the silver particles were observed with an optical microscope. Through this evaluation, the dispersion state of the silver particles in the silver particle dispersion and the corresponding black matrix can be evaluated.

Figure 1B:
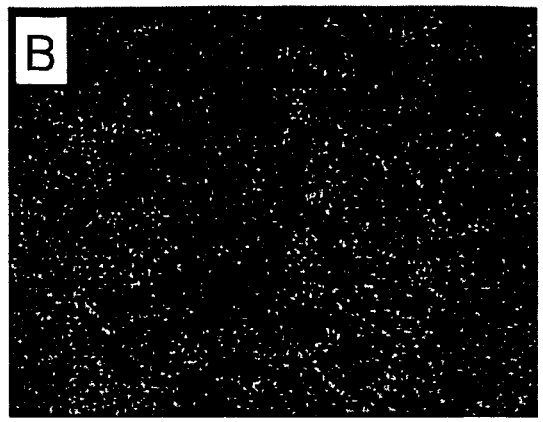
FIG. 1B is a photograph showing a rank B dispersion state of silver particles.
Figure 1C:
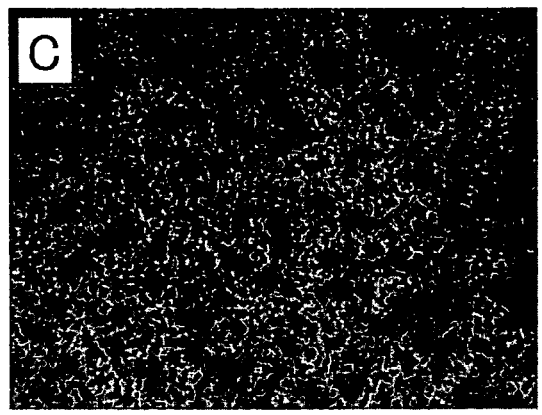
FIG. 1C is a photograph showing a rank C dispersion state of silver particles.
Figure 1D:
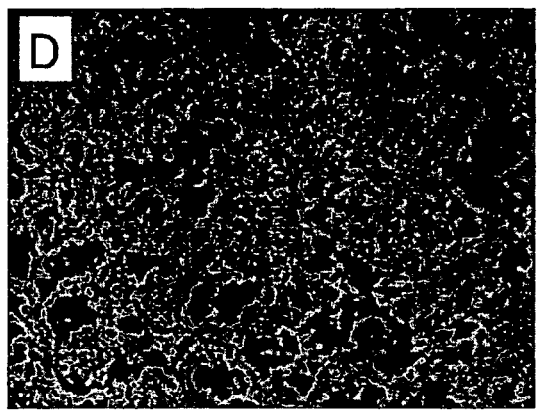
FIG. 1D is a photograph showing a rank D dispersion state of silver particles.
Figure 1E:
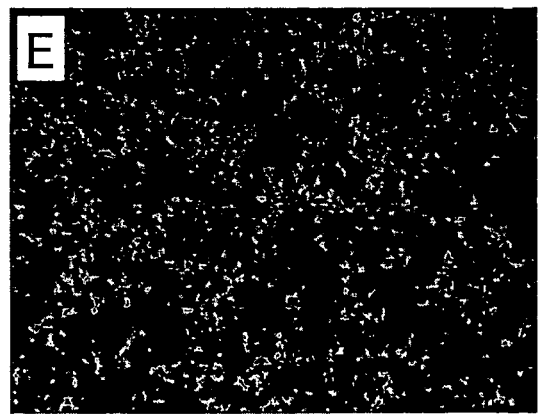
FIG. 1E is a photograph showing a rank E dispersion state of silver particles.

In the evaluation of dispersion state, the quality levels of the dispersion state was classified into five ranks from A to E. Photographs shown in FIGS. 1A to 1E show dispersion states corresponding to the ranks A to E, respectively. Only the A and B ranks are practically allowable.

The film thicknesses in Table 1 each show a film thickness required for obtaining an optical density of 3.6. Each film thickness was measured as follows: the black-matrix-forming coating liquid was applied onto a glass plate, the resultant film was exposed by using an extra-high pressure mercury lamp at an energy of 100 mJ/cm², and then the film thickness was measured by a surface roughness measuring instrument (trade name: P-1, manufactured by Tenkop Co.).

The color tone of the black matrix was evaluated by observing the matrix with the naked eye.

TABLE 1

| | Compound | Amount of the compound (g) | Dispersing medium | Dispersion result | Film thickness (μm) | Color tone |
|---|---|---|---|---|---|---|
| Example 1 | Compound 1 | 0.25 | Water | A | 0.27 | Satisfactory (black) |
| Example 2 | Compound 1 | 0.5 | Water | A | 0.28 | Satisfactory (black) |
| Example 3 | Compound 1 | 1.0 | Water | A | 0.30 | Satisfactory (black) |
| Example 4 | Compound 2 | 0.5 | Water | A | 0.33 | Satisfactory (black) |
| Example 5 | Compound 3 | 0.5 | Water | A | 0.32 | Satisfactory (black) |
| Example 6 | Compound 3 | 0.5 | Methyl ethyl ketone | A | 0.33 | Satisfactory (black) |
| Example 7 | Compound 4 | 0.5 | Toluene | B | 0.35 | Satisfactory (black) |
| Example 8 | Compound 4 | 1.0 | Toluene | B | 0.38 | Satisfactory (black) |
| Example 9 | Compound 4 | 2.0 | Toluene | B | 0.41 | Satisfactory (black) |
| Comparative Example 1 | Not Added | — | Water | E | 0.86 | Unsatisfactory (brownish black) |
| Comparative Example 2 | Compound 5 | 0.5 | Water | D | 0.88 | Unsatisfactory (brownish black) |
| Comparative Example 3 | Compound 6 | 0.5 | Water | D | 0.85 | Unsatisfactory (brownish black) |

Compound 1: M205 (polyvinyl alcohol with SH at a terminal, manufactured by Kuraray Co., Ltd.)
Compound 2: M115 (polyvinyl alcohol with SH at a terminal, manufactured by Kuraray Co., Ltd.)
Compound 3: Sodium dodecylbenzenesulfonate
Compound 4: Dodecylamine
Compound 5: Polyvinyl alcohol
Compound 6: Methylcellulose Evaluation of Dispersion state and Optical Density of the Silver Particles in the Black Matrix Table 1 shows the dispersion state of the silver particles, and the film thickness and color tone of the black matrix in Examples 1 to 9 and Comparative Examples 1 to 3.

Evaluation of the dispersion state of the silver particles was conducted as follows: immediately after the preparation of the silver particle dispersion, the dispersion was applied to a glass substrate by using a spin coater, then the dispersion was As shown in Table 1 and FIGS. 1A to 1E, in the coaling solutions of the invention, the dispersion state of the silver particles was excellent and the dispersion state of metal particles in the obtained black matrix is excellent. This is because the solutions included the specific compounds (compounds (V)). Consequently, the black matrix realizes a required optical density even with a small film thickness. The color tone of the black matrix was black, thus satisfactory.

On the other hand, in Comparative Examples 1 to 3, since the compound (V) of the invention was not used in the black matrix, the dispersion state of the silver particles in the black matrix was poor and further the required film thickness of the black matrix was also large. Moreover, the color tone thereof was not black, thus unsatisfactory.

When the dispersing medium with a SP value of 9.0 or higher was used in the preparation of the silver particle dispersions (i.e., Examples 1 to 6), the dispersion state of the silver particles in the black matrix was particularly excellent, and a required optical density was obtained with a smaller film thickness of the black matrix.

As described above, in the metal-particle-containing composition of the invention, the dispersion stability of the metal particles is excellent and the storability of a coating liquid made of the composition is excellent since the composition comprises the specific compound. When this coating liquid is used to form a light shielding film, the dispersion state of the metal particles in the light shielding film is excellent and a required film thickness thereof for obtaining a necessary optical density can be small. Moreover, the light shielding film is superior in color tone. Furthermore, the light shielding film of the invention imposes only a small load on the surroundings at production thereof.

What is claimed is:

1. A light shielding film for a display device, comprising a polymer binder, particles of metal dispersed in the polymer binder, and a compound including a sulfur atom or a nitrogen atom,
    wherein the metal is selected from the group consisting of silver, gold, platinum, palladium, tungsten, titanium, and copper, or is an alloy comprising a metal selected from the group consisting of silver, gold, platinum, palladium, tungsten, titanium, and copper,
    and wherein a content of the compound including a sulfur atom or a nitrogen atom is 1% by mass or higher based on an amount of the particles of metal.

2. The light shielding film according to claim 1, wherein a content of the compound including a sulfur atom or a nitrogen atom is 3 to 30% by mass based on an amount of the particles of metal.

3. The light shielding film according to claim 1, wherein a content of the compound including a sulfur atom or a nitrogen atom is 10 to 20% by mass based on an amount of the particles of metal.

4. The light shielding film according to claim 1, wherein the compound including a sulfur atom or a nitrogen atom includes a thiol group, a thioether group, a thioxo group, an amino group, or an imino group.

5. The light shielding film according to claim 1, wherein the particles of metal are dispersed in a dispersing medium having an SP value of 9.0 or higher.

6. A composition comprising a polymer binder, particles of metal, and a compound including a sulfur atom or a nitrogen atom,
    wherein the metal is selected from the group consisting of silver, gold, platinum, palladium, tungsten, titanium, and copper, or is an alloy comprising a metal selected from the group consisting of silver, gold, platinum, palladium, tungsten, titanium, and copper, and
    wherein a content of the compound including a sulfur atom or a nitrogen atom is 1% by mass or higher based on an amount of the particles of metal.

7. The composition according to claim 6, wherein the composition is photosensitive.

8. A photosensitive transfer material comprising a temporary support and a photosensitive light shielding layer provided on the temporary support, wherein the photosensitive light shielding layer comprises a polymer binder, particles of metal, and a compound including a sulfur atom or a nitrogen atom,
    wherein the metal is selected from the group consisting of silver, gold, platinum, palladium, tungsten, titanium, and copper, or is an alloy comprising a metal selected from the group consisting of silver, gold, platinum, palladium, tungsten, titanium, and copper, and
    wherein a content of the compound including a sulfur atom or a nitrogen atom is 1% by mass or higher based on an amount of the particles of metal.

9. A process for producing a light shielding film, comprising: providing the composition of claim 6; and applying the composition to a substrate to form the light shielding film on the substrate.

10. The process according to claim 9, further comprising patterning the composition applied to the substrate, wherein the composition is photosensitive.

11. A process for forming a light shielding film, comprising:
    providing the photosensitive transfer material of claim 8;
    transferring the photosensitive light shielding layer of the photosensitive transfer material to a substrate; and
    patterning the photosensitive light shielding layer on the substrate.

12. A light shielding film produced by the process of claim 9.

13. A light shielding film produced by the process of claim 10.

14. A light shielding film produced by the process of claim 11.

15. A substrate for a display device, comprising the light shielding film of claim 1.

16. A color filter for a display device, comprising the light shielding film of claim 1.

17. The light shielding film according to claim 1, wherein the metal is silver or a silver alloy.

18. The composition according to claim 6, wherein the metal is silver or a silver alloy.

19. The photosensitive transfer material according to claim 8, wherein the metal is silver or a silver alloy.

* * * * *